United States Patent
So et al.

(10) Patent No.: US 10,904,610 B2
(45) Date of Patent: Jan. 26, 2021

(54) METHOD AND APPARATUS FOR TRANSMISSION AND RECEPTION OF MULTIMEDIA DATA

(71) Applicant: Samsung Electronics Co., Ltd., Suwon-si (KR)

(72) Inventors: Young-Wan So, Gunpo-si (KR); Kyung-Mo Park, Seoul (KR); Jae-Hyeon Bae, Seoul (KR); Hyun-Koo Yang, Seoul (KR); Byeong-Doo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/768,414

(22) PCT Filed: Oct. 13, 2016

(86) PCT No.: PCT/KR2016/011490
§ 371 (c)(1),
(2) Date: Apr. 13, 2018

(87) PCT Pub. No.: WO2017/065521
PCT Pub. Date: Apr. 20, 2017

(65) Prior Publication Data
US 2018/0302662 A1 Oct. 18, 2018

(30) Foreign Application Priority Data
Oct. 13, 2015 (KR) .................. 10-2015-0143109

(51) Int. Cl.
*H04N 7/16* (2011.01)
*H04N 21/439* (2011.01)
(Continued)

(52) U.S. Cl.
CPC ......... *H04N 21/439* (2013.01); *H04N 21/236* (2013.01); *H04N 21/434* (2013.01);
(Continued)

(58) Field of Classification Search
CPC .... H04N 21/439; H04N 21/643; H04N 21/84; H04N 21/854; H04N 21/8586; H04N 21/4302; H04N 21/8106
(Continued)

(56) References Cited

U.S. PATENT DOCUMENTS

2002/0001395 A1  1/2002  Davis et al.
2006/0209880 A1* 9/2006  Chang .............. H04N 21/43635
                                         370/464
(Continued)

FOREIGN PATENT DOCUMENTS

CN   101212492 A   7/2008
CN   101521781 A   9/2009
(Continued)

OTHER PUBLICATIONS

Chinese Office Action dated Dec. 18, 2019, issued in Chinese Patent Application No. 201680060173.X.
(Continued)

*Primary Examiner* — Jivka A Rabovianski
(74) *Attorney, Agent, or Firm* — Jefferson IP Law, LLP

(57) ABSTRACT

A method for transmitting media data according to an embodiment of the present disclosure comprises receiving meta data, converting the meta data into a predetermined format corresponding to a bit stream for media data, incorporating the converted meta data into the bit stream, and transmitting the bit stream incorporating the meta data.

13 Claims, 8 Drawing Sheets

(51) Int. Cl.
*H04N 21/236* (2011.01)
*H04N 21/434* (2011.01)
*H04N 21/643* (2011.01)
*H04N 21/84* (2011.01)
*H04N 21/854* (2011.01)
*H04N 21/858* (2011.01)

(52) U.S. Cl.
CPC .......... *H04N 21/643* (2013.01); *H04N 21/84* (2013.01); *H04N 21/854* (2013.01); *H04N 21/8586* (2013.01)

(58) Field of Classification Search
USPC .................................................. 725/139, 53
See application file for complete search history.

(56) References Cited

U.S. PATENT DOCUMENTS

| | | |
|---|---|---|
| 2007/0294964 A1 | 12/2007 | Schimmel et al. |
| 2008/0098445 A1 | 4/2008 | Hildebrand et al. |
| 2008/0162716 A1 | 7/2008 | Kayanuma et al. |
| 2008/0172451 A1 | 7/2008 | Kim et al. |
| 2009/0100083 A1 | 4/2009 | Cho |
| 2011/0292173 A1 | 12/2011 | Tsukagoshi |
| 2012/0092444 A1* | 4/2012 | Mackie ............... H04L 12/1822 348/14.12 |
| 2013/0093952 A1 | 4/2013 | Lefevre et al. |
| 2013/0346564 A1 | 12/2013 | Warrick et al. |
| 2014/0089985 A1* | 3/2014 | Kawakita ............... H04H 20/28 725/53 |
| 2014/0115060 A1 | 4/2014 | Kim et al. |
| 2015/0358507 A1* | 12/2015 | Eyer .................. H04N 21/4302 348/515 |
| 2018/0006749 A1* | 1/2018 | Oh ..................... H04N 21/2381 |
| 2018/0152498 A1 | 5/2018 | Luby et al. |

FOREIGN PATENT DOCUMENTS

| | | |
|---|---|---|
| CN | 101841639 A | 9/2010 |
| CN | 102263989 A | 11/2011 |
| CN | 102550034 A | 7/2012 |
| CN | 104125488 A | 10/2014 |
| CN | 104221390 A | 12/2014 |
| CN | 104904230 A | 9/2015 |
| JP | 2003-520008 A | 6/2003 |
| JP | 2007-520171 A | 7/2007 |
| JP | 2012-010311 A | 1/2012 |
| JP | 2015-027091 A | 2/2015 |
| KR | 10-2003-0024416 A | 3/2003 |
| KR | 10-2007-0017498 A | 2/2007 |
| KR | 10-2008-0066513 A | 7/2008 |
| KR | 10-2013-0088827 A | 8/2013 |
| WO | 2014/014252 A1 | 1/2014 |

OTHER PUBLICATIONS

Japanese Office Action dated Aug. 25, 2020, issued in Japanese Patent Application No. 2018-519483.

* cited by examiner

METHOD AND APPARATUS FOR TRANSMISSION AND RECEPTION OF MULTIMEDIA DATA

CROSS-REFERENCE TO RELATED APPLICATION(S)

This application is a U.S. National Stage application under 35 U.S.C. § 371 of an International application PCT/KR2016/011490, filed on Oct. 13, 2016, which is based on and claimed priority of a Korean patent application number 10-2015-0143109, filed on Oct. 13, 2015, in the Korean Intellectual Property Office, the disclosure of which is incorporated by reference in its entirety.

TECHNICAL FIELD

The present disclosure generally relates to a method and apparatus for transmitting and receiving multimedia data.

BACKGROUND ART

Current digital broadcasting is expected to evolve into stereo 3D video broadcasting, Ultra High Definition (UHD) broadcasting, multi-view 3D video broadcasting, hologram broadcasting, etc., and there is a prospect that a current Moving Picture Experts Group 2 (MPEG2)-transport stream (TS) may become inefficient because in each forward step, a larger amount of data transmission is required. For example, since UHD broadcasting may have a resolution that is four-times (4K-level) or 16-times than that of an existing high definition (HD) TV, a 6-MHz TV program may be difficult to transmit in one channel in spite of application of a high-efficiency compression scheme. As such, when high data rate for data is needed, an MPEG-2 TS having a packet with a fixed length of 188 bytes is unsuitable. Moreover, in an environment where all other networks than a broadcasting network change into an Internet Protocol (IP) network, the MPEG-2 TS is not easy to use by mutual conversion with the IP. Hence, for commercializing UHD broadcasting, a new Audio Video (AV) delivery format is required which is IP-friendly and more efficient than the MPEG-2 TS.

DETAILED DESCRIPTION OF THE INVENTION

Technical Problem

An embodiment of the present disclosure provides a method and apparatus for transmitting multimedia data.

An embodiment of the present disclosure provides a method and apparatus for receiving multimedia data.

An embodiment of the present disclosure provides a method and apparatus for transmitting metadata information related to multimedia data to a user equipment.

An embodiment of the present disclosure provides a method and apparatus for receiving metadata information related to multimedia data in a user equipment.

An embodiment of the present disclosure provides a compressed media data format including metadata information related to contents.

An embodiment of the present disclosure provides a method and apparatus for transmitting metadata to a user equipment using the compressed media data format.

An embodiment of the present disclosure provides a method and apparatus for providing an additional service using metadata which is delivered to the user equipment using the compressed media data format.

Technical Solution

An embodiment of the present disclosure provides a method for providing media data in a set top box. The method comprises receiving an audio bit stream including metadata related to the media data which supports a determined protocol; determining whether at least one of the set top box and the media playing apparatus supports the determined protocol; and determining whether to bypass the audio bit stream including the metadata to the media playing apparatus connected to the set top box based on whether the at least one of the set top box and the media playing apparatus supports the determined protocol.

An embodiment of the present disclosure provides a method for playing back media data in a media playing apparatus. The method comprises receiving an audio bit stream including metadata related to the media data from a set top box; extracting the metadata, converting the extracted metadata for processing the metadata; if the converted metadata includes partial information related to the playback of the media data, obtaining additional information related to the playback of the media data using a determined protocol and a determined interface; and playing back the media data using the partial information and the additional information.

An embodiment of the present disclosure provides a set top box for providing media data. The set top box comprises an input interface configured to receive an audio bit stream including metadata related to the media data which supports a determined protocol; a protocol detector configured to determine whether at least one of the set top box and the media playing apparatus supports the determined protocol; and a metadata generator configured to determine whether to bypass the audio bit stream including the metadata to the media playing apparatus connected to the set top box based on whether the at least one of the set top box and the media playing apparatus supports the determined protocol.

An embodiment of the present disclosure provides a media playing apparatus for playing back media data. The media playing apparatus comprises an input interface configured to receive an audio bit stream including metadata related to the media data from a set top box; a metadata extractor configured to extract the metadata; a metadata parser configured to convert the extracted metadata for processing the metadata; a media transmission processor configured to obtain additional information related to the playback of the media data using a determined protocol and a determined interface if the converted metadata includes partial information related to the playback of the media data; and a media player configured to play back the media data using the partial information and the additional information.

MODE FOR CARRYING OUT THE INVENTION

Figure 1:
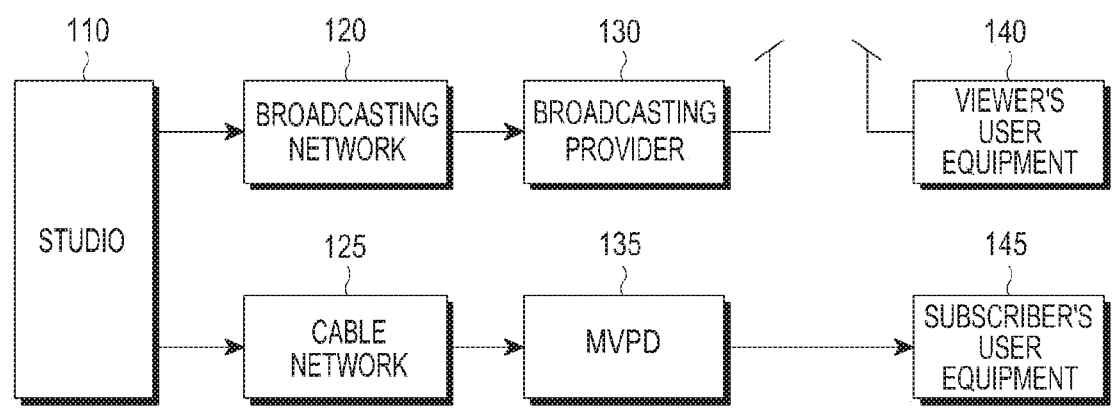
FIG. 1 illustrates an example of entities composing a service ecosystem of a general broadcasting network service.

Hereinafter, the operating principles of exemplary embodiments of the present disclosure will be described with reference to the accompanying drawings. Like components are referred to as like reference numerals even though being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Although the embodiments described below are separate from one another for ease of description, at least two or more of the embodiments may be combined together within such a range where they do not conflict one another.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

An apparatus and method proposed in the present disclosure may be applied to various communication systems such as a Long Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a 3rd Generation Project Partnership 2 (3GPP2) a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) 802.16m communication system, an Evolved Packet System (EPS), and a Mobile Internet Protocol (Mobile IP) system, and/or the like.

FIG. 1 illustrates an example of entities composing a service ecosystem of a general broadcasting network service.

Referring to FIG. 1, after contents produced in a studio 110 are delivered to a broadcasting provider 130 through a terrestrial broadcasting network 120, the contents may be directly delivered from the broadcasting provider 130 to a viewer's user equipment 140, or may be retransmitted to subscriber's user equipments 145 through a cable, a satellite, or an IP network after passing a Multichannel Video Programming Distributor (MVPD) 135. The MVPD 135 directly receives contents through a cable network 125 and delivers the contents to subscribers through a cable, a satellite, or an IP network.

Figure 2:
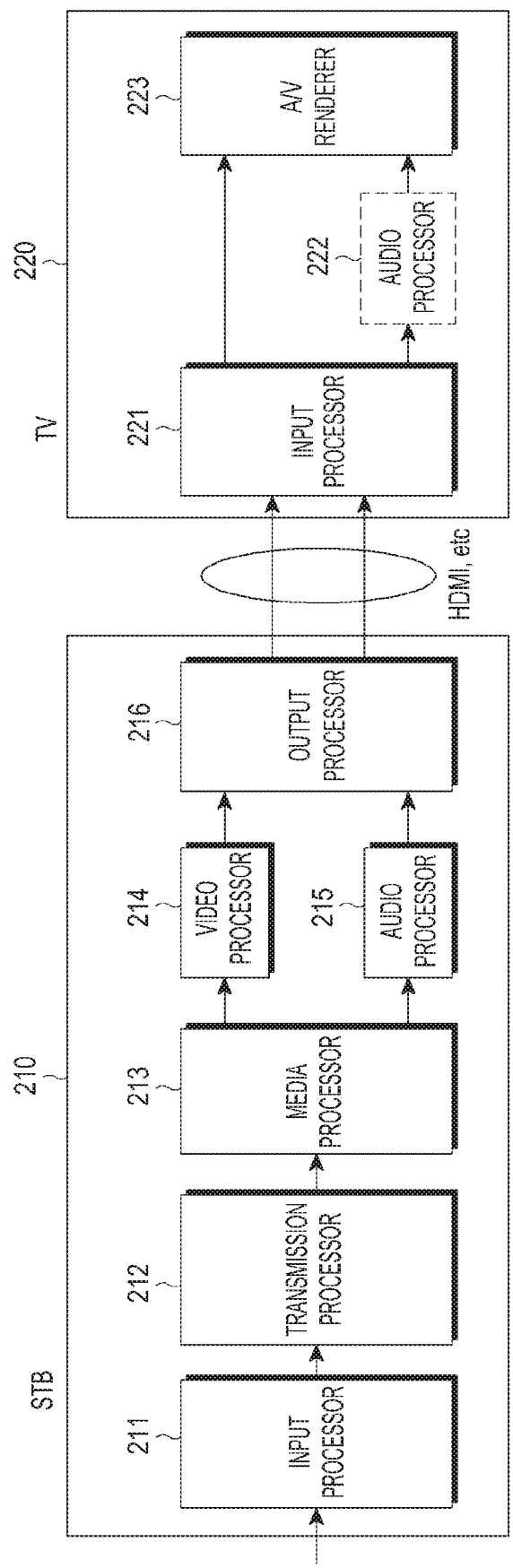
FIG. 2 illustrates an example of a media delivery structure of a general STB and TV.

FIG. 2 illustrates a media delivery structure of a general set top box (STB) 210 and TV 220.

Referring to FIG. 2, the set top box 210 receives a broadcasting signal from the MVPD, and the broadcasting signal is converted into a digital signal in an input processor 211 of the set top box 210 and the digital signal is transmitted to a transmission processor 212.

The transmission processor 212 restores data units having a determined format using the input digital signal, and delivers the restored data units to a media processor 213. At this time, the data unit may have a form of an MPEG2-TS packet, an IP packet, an MPEG media transport Protocol (MMTP) packet, or a media file, and the data unit may deliver video and audio data, or metadata which composes a service. The media processor 213 extracts video data from the data unit to deliver the video data to a video processor 214, and extracts audio data from the data unit to deliver the audio data to an audio processor 215.

The metadata may be used for the media processor 213 to control operations of the video processor 214 and the audio processor 215. Generally, the video data and audio data delivered to the video processor 214 and the audio processor 215 have a form which is compressed through a determined compression algorithm, the video processor 214 may restore the video data into a uncompressed form to deliver the restored video data to an output processor 216 of the set top box 210, and the audio processor 215 may deliver, i.e., bypass, the audio data (a uncompressed form or a compressed form) to the set top box output processor 216. The compression algorithm may be, for example, High Efficiency Video Coding (HEVC) defined in an MPEG-H or 3D-Audio.

The output processor 216 of the set top box 210 delivers a video and audio signal to an input processor 221 of the TV 220 through a delivery medium. The delivery medium may be, for example, a High Definition Multimedia Interface (HDMI) cable, a red-green-blue (RGB) cable, or a component cable. The input processor 221 of the TV 220 delivers the video and audio signal delivered through the delivery medium to an A/V renderer 223, and the A/V renderer 223 plays back a broadcasting service using the delivered video and audio signal.

During a media delivery process as described above, a problem that various metadata information included in contents is lost may occur. For example, before the video/audio signal is delivered to the TV 220 from the set top box 210 through an HDMI/RGB cable, etc., media data input to the set top box 210 is processed by the media processor 213 or the video processor 214 and the audio processor 215 of the set top box 210, such that the metadata information may be entirely consumed or removed and only the pure video and audio signal which does not include metadata may be delivered in an uncompressed form to the TV 220. In this case, a problem that metadata which may be used in the TV 220 is lost and then the TV 220 may not use the metadata occurs.

For reference, the metadata may be, for example, information which may be used for the TV 220 to obtain additional contents related to a broadcasting service which is being currently played back through an internet network. In this example, if the metadata is lost, the TV 220 may not obtain the additional contents.

An output stream of a compressed media format according to an embodiment of the present disclosure includes metadata. Examples in which metadata is included in an output stream of an audio signal of a determined format will be described below. The determined format is explained based on MPEG-H 3D Audio, however, it will be apparent that embodiments of the present disclosure may be applied to other media formats. For reference, MPEG-H 3D Audio is a next generation-high quality audio codec which has been standardized in MPEG.

MPEG-H 3D Audio Embodiment 1

The first embodiment of MPEG-H 3D Audio is a scheme of including metadata into a stream using an Extended Element which exists within mpegh3daFrame( ) within a core bit stream, and this scheme is a scheme in which modification of a bit stream is the easiest and which may minimize required bit-consumption. An example of mpegh3daExtElementConfig( ) according to the first embodiment will be shown in Table 1.

TABLE 1

| Syntax | No. of bits | Mnemonic |
|---|---|---|
| mpegh3daExtElementConfig( ) | | |
| { | | |
|   usacExtElementType = escapedValue(4, 8, 16); | | |
|   usacExtElementConfigLength = escapedValue(4, 8, 16); | | |
|   if (usacExtElementDefaultLengthPresent) { | 1 | uimsbf |
|     usacExtElementDefaultLength = escapedValue(8, 16, 0) + 1; | | |
|   } else { | | |
|     usacExtElementDefaultLength = 0; | | |
|   } | | |
|   usacExtElementPayloadFrag; | 1 | uimsbf |
|   switch (usacExtElementType) { | | |
|   case ID_EXT_ELE_FILL: | | |
|     /* No configuration element */ | | |
|     break; | | |
|   case ID_EXT_ELE_MPEGS: | | |
|     SpatialSpecificConfig( ); | | |
|     break; | | |
|   case ID_EXT_ELE_SAOC: | | |
|     SAOCSpecificConfig( ); | | |
|     break; | | |
|   case ID_EXT_ELE_AUDIOPREROLL: | | |
|     /* No configuration element */ | | |
|     break; | | |
|   case ID_EXT_ELE_UNI_DRC: | | |
|     mpegh3daUniDrcConfig( ); | | |
|     break; | | |
|   case ID_EXT_ELE_OBJ_METADATA: | | |
|     ObjectMetadataConfig( ); | | |
|     break; | | |
|   case ID_EXT_ELE_SAOC_3D: | | |
|     SAOC3DSpecificConfig( ); | | |
|     break; | | |
|   Case ID_EXT_ELE_HOA: | | |
|     HOAConfig( ); | | |
|     break; | | |
|   case ID_EXT_ELE_FMT_CNVRTR | | |
|     /* No configuration element */ | | |
|     break; | | |
|   case ID_EXT_ELE_SYS_META | | |
|     /* No configuration element */ | | |
|     break; | | |
|   default: | | NOTE |
|     while (usacExtElementConfigLength-) { | | |
|       tmp; | 8 | uimsbf |
|     } | | |
|     break; | | |
|   } | | |
| } | | |

NOTE:
The default entry for the usacExtElementType is used for unknown extElementTypes so that legacy decoders can cope with future extensions.

In Table 1, "usacExtElementType" is a component element for informing a bit stream extension type, and the detailed meaning may be defined as Table 2.

TABLE 2

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| ID_EXT_ELE_FMT_CNVRTR | 8 |
| ID_EXT_ELE_SYS_METAL | 9 |
| /* reserved for ISO use */ | 10-127 |
| /* reserved for use outside of ISO scope */ | 128 and higher |

NOTE:
Application-specific usacExtElementType values are mandated to be in the space reserved for use outside of ISO scope. These are skipped by a decoder as a minimum of structure is required by the decoder to skip these extensions.

Table 3 shows an example of "usacExtElementSegmentData" according to "usacExtElementType".

TABLE 3

| usacExtElementType | The concatenated usacExtElementSegmentData represents: |
|---|---|
| ID_EXT_ELE_FILL | Series of fill_byte |
| ID_EXT_ELE_MPEGS | SpatialFrame( ) |
| ID_EXT_ELE_SAOC | SaocFrame( ) |
| ID_EXT_ELE_AUDIOPREROLL | AudioPreRoll( ) |
| ID_EXT_ELE_UNI_DRC | uniDrcGain( ) as defined in ISO/IEC 23003-4 |
| ID_EXT_ELE_OBJ_METADATA | object_metadata( ) |
| ID_EXT_ELE_SAOC_3D | Saoc3DFrame( ) |
| ID_EXT_ELE_HOA | HOAFrame( ) |
| ID_EXT_ELE_FMT_CNVRTR | FormatConverterFrame( ) |
| ID_EXT_ELE_SYS_META | SysMetaFrame( ) |
| unknown | unknown data. The data block shall be discarded. |

An example of SysMetaFrame( ) in Table 3 is shown in Table 4.

TABLE 4

| Syntax | No. of bits | Mnemonic |
|---|---|---|
| SysMetaFrame( ) | | |
| { | | |
|   sysType = escapedValue (2, 4, 0); | | |
|   msgLen = escapedValue (4, 8, 16); | | |
|   msgType = escapedValue (3, 5, 0); | | |
|   switch (msgType) { | | |
|   case NO_SYS_MSG: | | |
|     /* No action */ | | |
|     break; | | |
|   case MSG_START: | | |
|     ReadMsgBuffer( ); | | NOTE 1 |
|     break; | | |
|   case MSG_APPEND: | | |
|     AppndMsgBuffer( ); | | NOTE 2 |
|     break; | | |
|   case MSG_END: | | |
|     AppendMsgBuffer( ); | | |
|     SendMsgBuffer( ); | | NOTE 3 |
|     break; | | |
|   case MSG_ONE: | | |
|     ReadMsgBuffer( ); | | |
|     SendMsgBuffer( ); | | |

TABLE 4-continued

| Syntax | No. of bits | Mnemonic |
|---|---|---|
|     default: | | NOTE 4 |
|     while (msgLen -) { | | |
|       tmp; | 8 | uimsbf |
|     } | | |
|     break; | | |
|   } | | |
| } | | |

NOTE 1:
ReadMsgBuffer( ) reads msgLen bytes from the bitstream and copies to the initialized empty buffer for the sysType.
NOTE 2:
AppndMsgBuffer( ) reads msgLen bytes from the bitstream and append to the pre-defined buffer for the sysType.
NOTE 3:
SendMsgBuffer( ) sends the whole data written on the buffer for the sysType to the destination defined in Table B.
NOTE 4:
The default entry for the msgType is used for unknown extElementTypes so that legacy decoders can cope with future extensions.

"msgType" included in Table 4 is a component element for signaling whether metadata is included in a corresponding stream and whether the metadata is segmented, and an example of a specific value thereof is shown in Table 5.

TABLE 5

| msgType | Value |
|---|---|
| NO_SYS_MSG | 0 |
| MSG_START | 1 |
| MSG_APPEND | 2 |
| MSG_END | 3 |
| MSG_ONE | 4 |
| /* reserved */ | 5 and higher |

Further, "sysType" included in Table 4 is a component element for signaling an expression type of metadata, an MPEG system for processing the metadata, and/or the like, and an example of a specific value thereof is shown in Table 6.

TABLE 6

| sysType | Value | Destination |
|---|---|---|
| SYS_MP2TS | 0 | MPEG 2 TS Packet with Section[ ] |
| SYS_MMT | 1 | MMTP Packet for Signaling Message[ ] |
| SYS_DASH | 2 | DASH MPD |
| /* reserved */ | 3 and higher | |

Referring to Table 6, it will be understood that metadata is configured as a form of an MPEG2-TS packet if "sysType" is "SYS_MP2TS", and metadata is configured as a form of an MMTP packet if "sysType" is "SYS_MMT". In another embodiment, the MPEG2-TS packet and the MMTP packet may have a packet structure for delivering a signaling message. If "sysType" is "SYS_DASH", metadata is a document with an xml form such as a Dynamic Adaptive Streaming over HTTP (DASH) media presentation description (MPD), or the metadata may be Uniform Resource Locator (URL) information for a TV to obtain the xml document in other embodiment.

In an embodiment which will use Table 6, it is assumed that a packet is delivered, however, in a practical implementation, various types of metadata as the following may be delivered.

MMT signaling messages
    MMT signaling tables
    MPEG2 sections
    Additional audio data Bootstrap information for obtaining an additional service (e.g. URL)

Identifier of an audio bit stream in which metadata is transmitted or an identifier of a service including audio (e.g. Asset_id)

Alternatively, data of a general file format may be delivered though SysMetaFrame( ), and sysType may have a value of SYS_FILE. Further, it will be noted that the data of the file format may be configured as a separate frame, not a type included in SysMetaFrame( ) and the configured frame may be delivered. A form of metadata may include a general IP packet, a document of an HyperText Markup Language (HTML) form, and/or the like by extending sysType in Table 6.

MPEG-H 3D Audio Embodiment 2

The second embodiment of MPEG-H 3D Audio is a scheme of adding metadata to mpegh3daFrame( ) as a level higher than an embodiment as described in <MPEG-H 3D Audio embodiment 1>. The second embodiment is a scheme of adding metadata to a "usacElementType" field as a field according to a characteristic of an audio codec, and the "usacElementType" field is defined in Unified Speech and Audio Coding (USAC), not MPEG-H 3D Audio. An example of mpegh3daFrame( ) according to the second embodiment of the present disclosure will be shown in Table 7.

TABLE 7

| Syntax | No. of bits | Mnemonic |
| --- | --- | --- |
| mpegh3daFrame( ) { | | |
|   usacIndependencyFlag; | 1 | uimsbf |
|   for (elemIdx=0; elemIdx<numElements; ++elemIdx) { | | |
|     if ( (usacElementType[elemIdx] != ID_USAC_EXT) && (elementLengthPresent == 1) ) { | | |
|       elementLength | 16 | uimsbf |
|     } | | |
|     switch (usacElementType[elemIdx]) { | | |
|     case ID_USAC_SCE: | | |
|       mpegh3daSingleChannelElement(usacIndependencyFlag); | elementLength, NOTE 1 | |
|       break; | | |
|     case ID_USAC_CPE: | | |
|       mpegh3daChannelPairElement(usacIndependencyFlag); | elementLength, NOTE 1 | |
|       break; | | |
|     case ID_USAC_LFE: | | |
|       mpegh3daLfeElement(usacIndependencyFlag); | elementLength, NOTE 1 | |
|       break; | | |
|     case ID_USAC_EXT: | | |
|       mpegh3daExtElement(usacIndependencyFlag); | | |
|     break; | | |
|     case ID_USAC_SysMeta: | elementLength | |
|       mpegh3daSysMetaElement(usacIndependencyFlag); | | |
|     break; | | |
|     } | | |
|   } | | |
| } | | |

NOTE 1:
If present, elementLength represents the length of the corresponding element it refers to in number of bits.

mpegh3daSysMetaElement( ) in Table 7 may be configured with a form similar to SysMetaFrame( ) in Table 4, and a detailed grammar thereof will be omitted herein.

MPEG-H 3D Audio Embodiment 3

In the third embodiment of MPEG-H 3D Audio, metadata is included in "mpegh3daConfigExtension". The third embodiment is mainly used in a case that there is modification to a configuration file, and one mp4 file requires one reference. An example of "mpegh3daConfigExtension" according to the third embodiment of the present disclosure will be shown in Table 2

TABLE 8

| Syntax | No. of bits | Mnemonic |
| --- | --- | --- |
| mpegh3daConfigExtension( ) { | | |
|   numConfigExtensions = escapedValue(2,4,8) + 1; | | |
|   for (confExtIdx=0; confExtIdx<numConfigExtensions; conf ExtIdx++) { | | |

TABLE 8-continued

| Syntax | No. of bits | Mnemonic |
|---|---|---|
| usacConfigExtType[confExtIdx]    = escapedValue(4,8,16);<br>usacConfigExtLength[confExtIdx]    = escapedValue(4,8,16);<br>  switch (usacConfigExtType[confExtIdx]) {<br>  case ID_CONFIG_EXT_FILL:<br>    while (usacConfigExtLength[confExtIdx]-) {<br>      fill_byte[i]; /* should be '10100101' */<br>    }<br>    break;<br>  case ID_CONFIG_EXT_DOWNMIX:<br>    downmixConfig( );<br>    break;<br>  case ID_CONFIG_EXT_LOUDNESS_INFO:<br>    mpegh3daLoudnessInfoSet( );<br>    break;<br>  case ID_CONFIG_EXT_AUDIOSCENE_INFO:<br>    mae_AudioSceneInfo( );<br>    break;<br>  case ID_CONFIG_EXT_HOA_MATRIX:<br>    HoaRenderingMatrixSet( );<br>    break;<br>  case ID_CONFIG_EXT_SYS_META:<br>    sysConfig( );<br>    break;<br>  default:<br>    while (usacConfigExtLength[confExtIdx]-) {<br>      tmp;<br>    }<br>    break;<br>  }<br>  }<br>} | 8<br><br><br><br><br><br><br><br><br><br><br><br><br><br><br><br><br><br><br><br><br>8 | uimsbf<br><br><br><br><br><br><br><br><br><br><br><br><br><br><br><br><br><br><br><br><br>uimsbf |

"usacConfigExtType" in Table 8 may be defined as Table 9.

TABLE 9

| usacConfigExtType | Value |
|---|---|
| ID_CONFIG_EXT_FILL | 0 |
| ID_CONFIG_EXT_DOWNMIX | 1 |
| ID_CONFIG_EXT_LOUDNESS_INFO | 2 |
| ID_CONFIG_EXT_AUDIOSCENE_INFO | 3 |
| ID_CONFIG_EXT_HOA_MATRIX | 4 |
| ID_CONFIG_EXT_SYS___META | 5 |
| /* reserved for ISO use */ | 6-127 |
| /* reserved for use outside of ISO scope*/ | 128 and higher | sysConfig( ) in Table 8 may be configured with a form similar to SysMetaFrame( ) in Table 4, and a detailed grammar thereof will be omitted herein.

An embodiment of delivering metadata included in multimedia contents to a user equipment will be described below.

Metadata according to an embodiment of the present disclosure is delivered to a user equipment (or a media playing apparatus) through an MVPD transmission network such as a cable, a satellite, an IP, and/or the like, and a set top box, and includes all data which may be used in the user equipment. The user equipment may be, for example, a TV, and, hereinafter, the TV will be described as a typical one of the user equipment.

In the present disclosure, metadata may include the following information.

For example, the metadata may include an identifier for a service in which an audio bit stream including the metadata is included. At this time, the identifier may be for identifying an audio service compressed as the audio bit stream, and, in other embodiment, may be for identifying a video service related to the audio service or a multimedia service including all of the audio service and the video service.

For another example, the metadata may include information for a TV to obtain video/audio data which is not transferred from a set top box through other transmission medium and playing back the video/audio data. That is, the metadata may include information related to media obtainment. The other transmission medium may include a wired internet, a Wi-Fi network, 3G/4G/5G mobile networks, a storage medium such as a Universal Serial Bus (USB), and/or the like. Further, a standard technology such as MPEG2-TS, MPEG Media Transport (MMT), Dynamic Adaptive Streaming over HTTP (DASH), and/or the like defined in an association such MPEG, and/or the like, or a technology such as HTTP Live Streaming (HLS), and/or the like may be used as a mechanism for obtaining the video/audio data. Here, a type of metadata may follow a type of a packet defined in the described mechanisms for obtaining the video/audio data or an expression type of metadata of a signaling message.

In still another embodiment, the metadata may include a firmware which is applied to a TV, various software, or information related to delivery of a general file, and/or the like. The metadata may be configured with a general bit stream form, or a file format or a packet form defined in a standard association. The packet may use a scheme defined in a protocol used in a current industry such as an IP packet, a UDP packet, an RDP packet, and/or the like. The metadata may further include information about an application in which the metadata is delivered, and/or the like.

Meanwhile, a subject of generating metadata in an embodiment of the present disclosure may be at least one of entities as shown in FIG. 1.

In an embodiment, the metadata may be included in an audio bit stream which is generated and compressed by the studio 110 during a contents producing process. In another embodiment, the metadata generated in the studio 110 may be replaced with metadata newly generated in the broadcasting network 120, a cable network 125, and/or the like. In still another embodiment, the metadata may be newly generated or modified in the broadcasting provider 130 or the MVPD 135. Further, the metadata may be newly generated or modified in a set top box connected to the subscriber's TV 145.

Referring back to FIG. 2, a set top box according to an embodiment of the present disclosure may be configured as the following.

The audio processor 215 receives an audio bit stream, and transfers, i.e., bypasses the received audio bit stream to the set top box output device 216 without performing uncompressed processing on the received audio bit stream. So, metadata included in the audio bit stream is delivered to the TV 220 through the input processor 221 of the TV.

The audio processor 222 within the TV according to an embodiment of the present disclosure includes an audio metadata processor (not shown) for processing metadata transmitted through the audio bit stream. According to embodiments of the metadata as described above, an operation of the audio metadata processor is determined according to a kind of audio metadata included in an audio bit stream.

Figure 3:
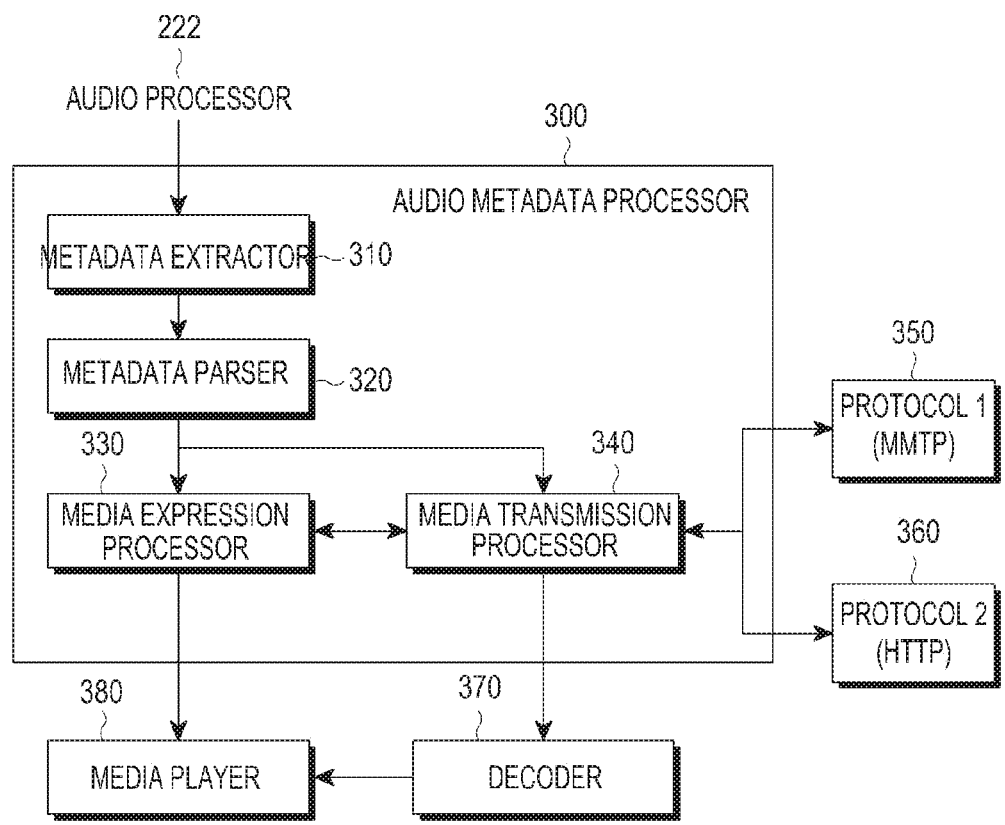
FIG. 3 illustrates an example of a structure of an audio metadata processor of a TV according to an embodiment of the present disclosure.

FIG. 3 illustrates an example of a structure of an audio metadata processor in a TV according to an embodiment of the present disclosure.

Firstly, an operation in a case that metadata includes information required for playing back media data and information related to obtainment of the media data will be described below.

Referring to FIG. 3, an audio metadata processor 300 receives metadata from an audio processor 222 in FIG. 2. A metadata extractor 310 may perform a processing process for extracting the metadata. The extracted metadata is delivered to a metadata parser 320, and the metadata parser 320 converts the metadata into a type of information required for an operation of the audio metadata processor 300.

Information related to a playback of media among the metadata parsed in the metadata parser 320 is delivered to a media expression processor 330, and information related to obtainment of media data (e.g., a URL at which media data is stored) among the metadata parsed in the metadata parser 320 is delivered to a media transmission processor 340. The media expression processor 330 extracts and processes the information related to the playback of the media to deliver the processed information to a media player 380. The media transmission processor 340 obtains media data from a media server (not shown) through a separate transmission interface and protocols 350 and 360 using the information related to the obtainment of the media data (e.g., a URL), and delivers the obtained media data to a decoder 370. In FIG. 3, an example of the separate protocol is shown as an MMTP 350 and an HTTP 360. The media player 380 play backs the decoded media data using the information delivered from the media expression processor 330.

Like this, the metadata may not include all of the information required for the playback of the media. In this case, the media transmission processor 340 obtains additional information required for the playback of the media using the information required for the obtainment of the media data from a separate server using the transmission interface and the protocols 350 and 360, and delivers the obtained additional information required for the playback of the media to the media expression processor 330.

For reference, in the embodiment as described above, an output of the audio processor 222 may be a form of an MMTP packet including an MMT signaling message. In this case, the metadata extractor 310 extracts the MMT signaling message from the MMTP packet to deliver the MMT signaling message to the metadata parser 320.

If the metadata includes an identifier of contents, the audio metadata processor 300 may check a list of an additional service identified by the identifier, obtain media data of the additional service and information required for playing back the additional service through a separate transmission medium according to user's selection or a determined policy, and deliver the media data of the additional service and the information required for playing back the additional service to the decoder 370 and the media player 380.

If the metadata has a form of a DASH Media Presentation Description (MPD), the audio metadata processor 300 delivers the DASH MPD to a separate DASH processor (not shown), and if the metadata is a URL of the DASH MPD, the audio metadata processor 300 obtains the DASH 1MPD using the URL to deliver the DASH MPD to the DASH processor.

In another embodiment, if the metadata includes data to be used in a specific interface, the audio metadata processor 300 may deliver the metadata delivered from the audio processor 222 corresponding to an interface used in the application.

For reference, the separate transmission interface may include Ethernet, Wi-Fi, and 3G/4G/5G mobile networks, a storage medium such as a USB, and/or the like. As described above, the transmission protocol may include the MMTP 350, the HTTP 360, and/or the like.

Meanwhile, in the embodiments as described above, the audio metadata processor 300 may be configured as a separate unit for processing each format according to a format of metadata, or may be configured as one unit using a component element such as the metadata parser 320 which may process a plurality of formats in one unit, and/or the like.

Further, all or some of component elements of the audio metadata processor 300 may be included in the audio processor 222, and the audio processor 222 may include an audio decoder (not shown) which may decode an audio signal.

A structure of an MVPD 135 as shown in FIG. 1 will be described below.

Figure 4:
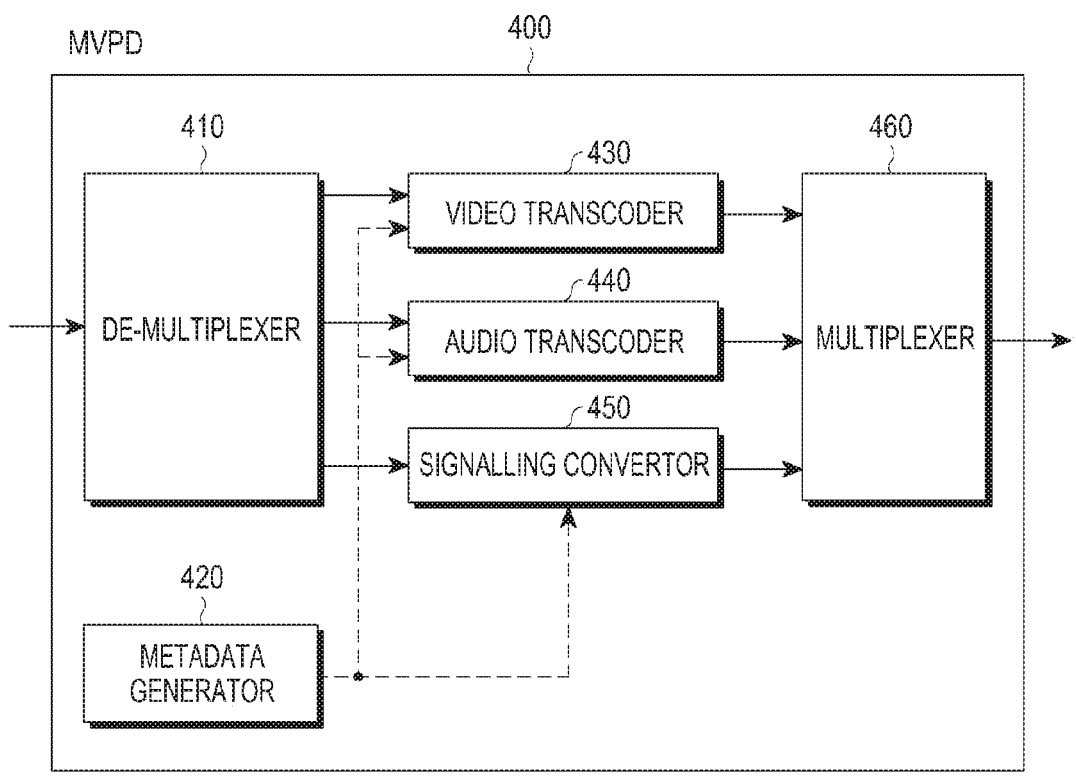
FIG. 4 illustrates an example of a structure of an MVPD retransmission system according to an embodiment of the present disclosure.

FIG. 4 illustrates an example of a structure of an MVPD according to an embodiment of the present disclosure.

Referring to FIG. 4, the MVPD 400 receives broadcasting service data from the cable network 125 or the broadcasting provider 130 in FIG. 1. The received broadcasting service data is de-multiplexed into a video signal, an audio signal, and signaling information in a de-multiplexer 410, and the video signal, the audio signal, and the signaling information are delivered to a video transcoder 430, an audio transcoder 440, and a signaling converter 450, respectively. At this time, a bit stream which composes the video signal and the audio signal may include metadata inserted by the cable network 125, the broadcasting provider 130, or the studio 110.

The transcoders 430 and 440 may perform an operation of appropriately converting a bitstream such as conversion of a resolution of received video data or a bit rate of received audio data, and/or the like. Meanwhile outputs of the video transcoder 430, the audio transcoder 440, and the signaling converter 450 are delivered to a user equipment 145 through a multiplexer 460.

The MVPD 400 according to an embodiment of the present disclosure may include a metadata generator 420. The metadata generator 420 generates metadata to be delivered to a subscriber's user equipment, e.g., a TV and metadata to be delivered to a subscriber's set top box. The metadata to be delivered to the subscriber's TV is delivered to the video transcoder 430 or the audio transcoder 440, and the metadata to be delivered to the subscriber's set top box is delivered to the signaling converter 450.

The video transcoder 430 and the audio transcoder 440 may interpret a bit stream, and generate a new bit stream by deleting metadata included in a received bit stream, replacing the metadata included in the received bit stream with the metadata delivered from the metadata generator 420, or adding the metadata delivered from the metadata generator 420 while maintaining the metadata included in the received bit stream.

If an input/output interface of the MVPD 400 has a separate mechanism according to a kind of media data, the MVPD 400 may not include the de-multiplexer 410 and a multiplexer 460 in FIG. 4.

The metadata generator 420 may generate metadata including information related to service configuration of an MVPD service, a personalized advertisement, or information to be delivered to a subscriber's TV or set top box, or receive metadata to be delivered by a third party to the subscriber's TV or set top box from the third party and deliver the received metadata to the subscriber's TV or set top box.

In another embodiment, if the MVPD 400 has a transmission medium capable of delivering personalized metadata to subscriber's set top box and TV, the metadata generated by the metadata generator 420 may be directly delivered to the subscriber's set top box and TV depending on a purpose of the metadata. At this time, the audio metadata processor 300 of the TV may obtain and process the metadata using a separate interface, not the audio processor 222.

The operation of the MVPD 400 as described above may be equally applied to a case that the broadcasting provider 130 delivers a broadcasting service delivered from the broadcasting network 120 to an MVPD 135, and any entity which delivers broadcasting service data.

Figure 5:
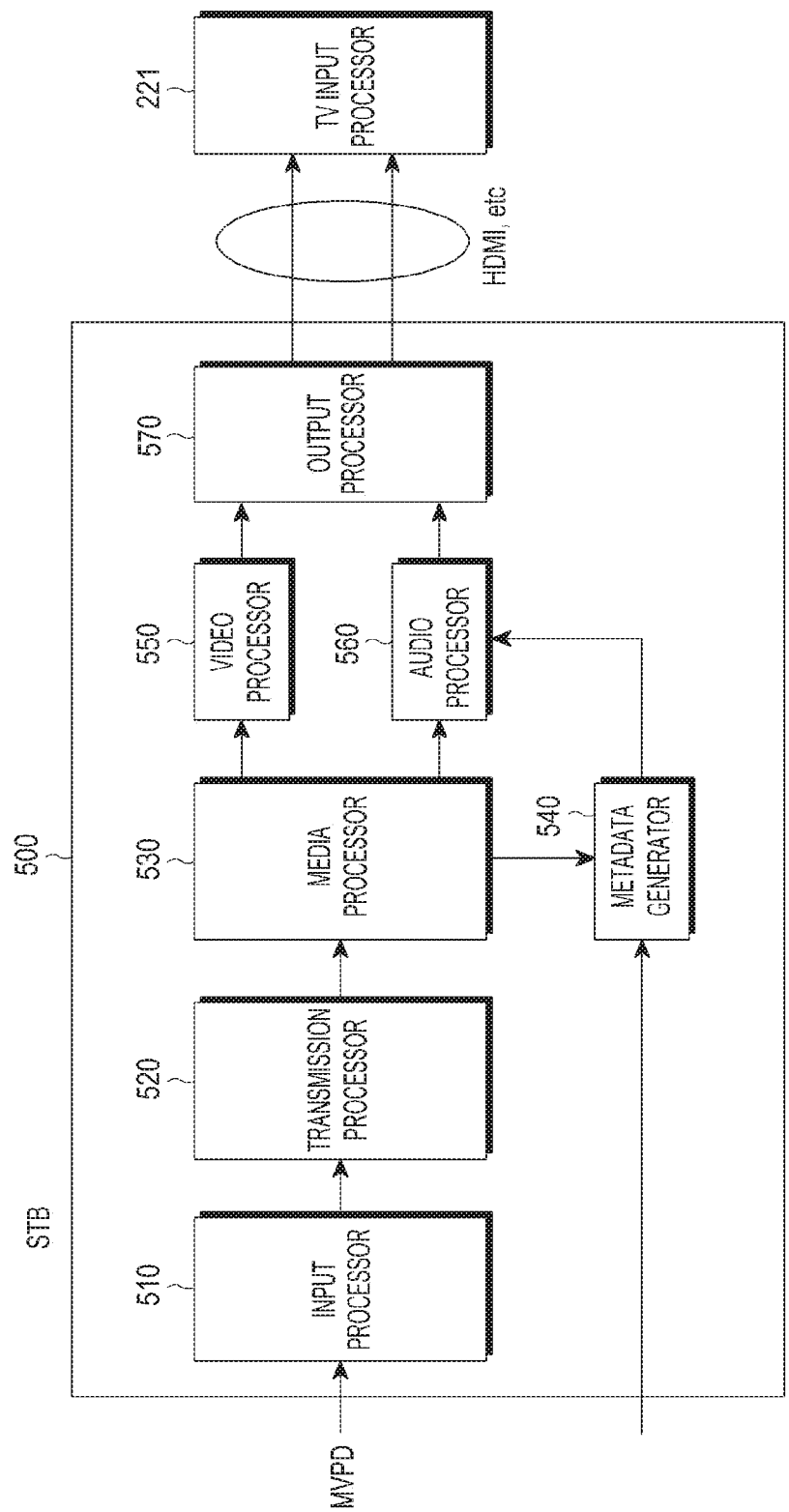
FIG. 5 illustrates an example of a functional structure of an STB according to an embodiment of the present disclosure.

FIG. 5 illustrates an example of a structure of a set top box 500 according to an embodiment of the present disclosure.

Referring to FIG. 5, the set top box 500 receives a broadcasting signal from the MVPD 400, and the broadcasting signal is converted into a digital signal in an input processor 510 and the digital signal is delivered to a transmission processor 520.

The transmission processor 520 restores data units which have a determined format using the input digital signal to deliver the restored data units to a media processor 530. A data unit may have a form of an MPEG2-TS packet, an IP packet, an MMTP packet, or a media file, and include at least one of video data, audio data, or metadata which composes a service.

The media processor 530 extracts video data from the delivered data unit to deliver the extracted video data to a video processor 550, and extracts audio data from the delivered data unit to deliver the extracted audio data to an audio processor 560. The metadata may be used for the media processor 530 to control an operation of the video processor 550 and the audio processor 560, and metadata to be delivered to a TV may be delivered to a metadata generator 540.

The metadata generator 540 obtains metadata from at least one of the transmission processor 520, the media processor 530, or a separate input interface, and delivers the metadata to be delivered to the TV to the audio processor 560.

In another embodiment, if the set top box 500 is capable of exchanging data with a TV through Wi-Fi, and/or the like, the metadata generated in the metadata generator 420 may be directly delivered to a subscriber's TV based on a use thereof. At this time, the audio metadata processor 300 of the TV 220 may obtain the metadata using a separate interface, not the audio processor 222 to process the metadata.

Meanwhile, the audio processor 560 may interpret a received bit stream, and generate a new bit stream by deleting metadata included in the received bit stream, replacing the metadata included in the received bit stream with the metadata delivered from the metadata generator 540, or adding the metadata delivered from the metadata generator 540 while maintaining the metadata included in the received bit stream.

Even though not shown in FIG. 5, the video processor 550 according to an embodiment of the present disclosure, like the audio processor 560, may interpret a bit stream, and generate a new bit stream by deleting metadata included in an existing bit stream, replacing the metadata included in the existing bit stream with the metadata delivered from the metadata generator 540, or adding the metadata delivered from the metadata generator 540 while maintaining the metadata included in the existing bit stream.

A scheme of generating or processing metadata in a set top box according to an embodiment of the present disclosure will be described below.

Figure 6:
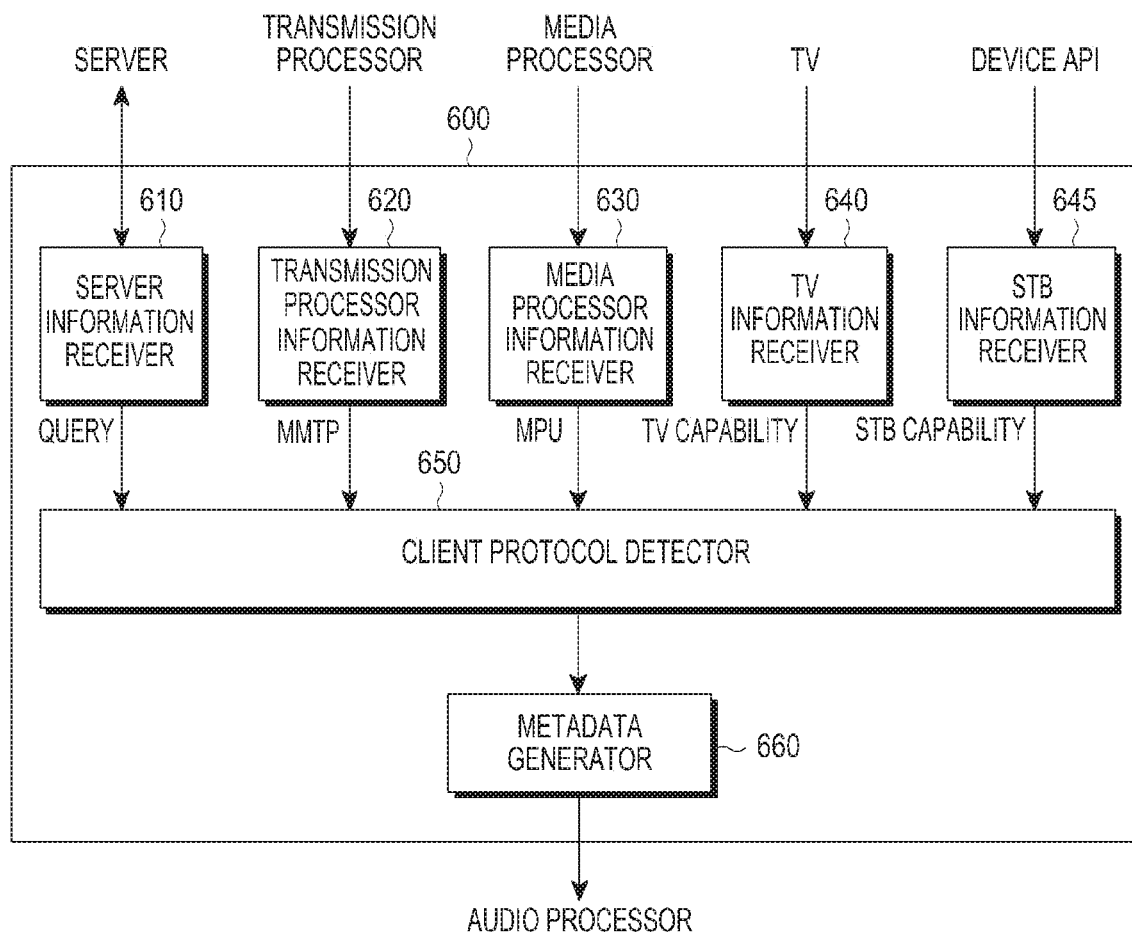
FIG. 6 illustrates an example of a structure of a metadata generator 600 located within an STB according to an embodiment of the present disclosure.

FIG. 6 illustrates an example of a structure of a metadata generator 600 located within a set top box according to an embodiment of the present disclosure.

Service Providers (SPs) know accurate information about presence of set top boxes as property thereof, functions/specifications/whether to support MMT, and/or the like, and a Contents Provider (CP) may exactly know or may not know information of a set top box according to whether a contract is made with an SP. However, in all of the two cases, a service provider or a contents provider may not know whether a TV which a user purchases and installs is a device which supports MMT.

In this case, all of a set top box and a TV which are located on a transmission path of audio metadata are devices which support a packet of a specific format, e.g., MMT (or DASH), it may be unclear which one of the set top box and the TV needs to perform an operation for processing the packet of the specific format. Hereinafter, it will be assumed that the specific format is the MMT.

In a case that metadata which is inserted by a Contents Provider (CP) into an audio bit stream needs to be processed in a set top box, if an audio bit stream including the metadata is delivered to a TV, a problem may occur. For this, the set top box needs to cause the TV not to perform a wrong operation related to metadata which is not intended by performing at least one of adding audio metadata information, changing the audio metadata information, replacing the audio metadata information, or deleting the audio metadata information according to whether the set top box and the TV are devices which support the MMT, i.e., capabilities of the set top box and the TV.

Referring to FIG. 6, the metadata generator 600 receives information related to a type and/or performance of a client device (e.g., a TV) which receives broadcasting media contents from a server information receiver 610, a transmission processor information receiver 620, a media processor information receiver 630, and a TV information receiver 640. The received information is delivered to a client protocol detector 650, and the client protocol detector 650 determines whether a current set top box or a TV connected to the set top box is a device supporting an MMT format or a device supporting a DASH format. A detailed operation of the client protocol detector 650 will be described below.

The client protocol detector 650 may extract information which may be used for determining whether the current set top box is the device supporting the MMT format from types (e.g., TS, MMT, DASH, and/or the like) of packets delivered from the transmission processor information receiver 620.

After receiving the information delivered from the media processor information receiver 630, the client protocol detector 650 may extract information used for determining whether the current set top box is the device supporting the MMT format using information of a media type (e.g., a MMT PA message and a DASH MPD) restored from the information.

If it is difficult that the client protocol detector 650 determines whether the current set top box is the device supporting the MMT format from information extracted from packets delivered from the server information receiver 610, the transmission processor information receiver 620, and the media processor information receiver 630, the client protocol detector 650 queries information related to determination of the format to a server of a provider and receives a response thereof to obtain information used for determining whether the current set top box is the device supporting the MMT.

The client protocol detector 650 may obtain information used for determining whether the TV connected to the current set top box is the device supporting the MMT format from the information delivered from the TV information receiver 640. This case is, for example, a case that a set top box 600 is connected to a TV with a Dongle or Wi-Fi.

The client protocol detector 650 may obtain information used for determining whether the current set top box is the device supporting the MMT format through an application programming interface (API) which the current set top box owns from a set top box information receiver 645.

After receiving information required for determining a protocol type which the TV connected to the set top box 600 supports from entities 610 to 645 of the set top box 600, the client protocol detector 650 determines whether the current set top box or the TV connected to the current set top box is a terminal supporting the MMT (or DASH) format. According to whether the current set top box or the TV connected to the current set top box is the device supporting the MMT (or DASH) format, an operation of deleting or modifying metadata may be performed in order to prevent the metadata related to a system from being inserted into an audio bit stream and to prevent the audio bit stream being delivered to the TV.

An operation of a set top box in possible cases will be described below according to whether to the set top box and a TV connected to the set top box support an MMT format.

Case 1-1

In a case that all of a current set top box and a TV connected to the set top box are devices supporting an MMT format, if unnecessary system metadata is inserted into an audio bit stream and the audio bit stream is delivered to the TV through the set top box, the TV may malfunction. In this case, the client protocol detector 650 of the set top box delivers the metadata included in the audio bit stream to the audio processor 222 of the set top box through a metadata generator 660, and the audio processor 222 deletes the metadata thereby preventing unnecessary metadata from being delivered to the TV.

Case 1-2

In a case that a current set top box is a device supporting MMT, and a TV connected to the set top box is a device which does not support the MMT, the TV merely acts as a display. So, if metadata is delivered to the TV, no problem occurs in the TV. So, the set top box deletes metadata included in an audio bit stream or does not need to delete the metadata included in the audio bit stream.

Case 1-3

In a case that a current set top box is a device which does not support MMT, and a TV connected to the set top box is a device supporting the MMT, only the TV may perform an operation of processing an MMT format, so the set top box delivers, i.e., bypasses, metadata included in an audio bit stream to the TV.

Case 1-4

In a case that all of a current set top box and a TV connected to the set top box are devices which do not support MMT, there is no device capable of processing an MMT format. So, the set top box does not need to perform any operation on metadata.

Figure 7:
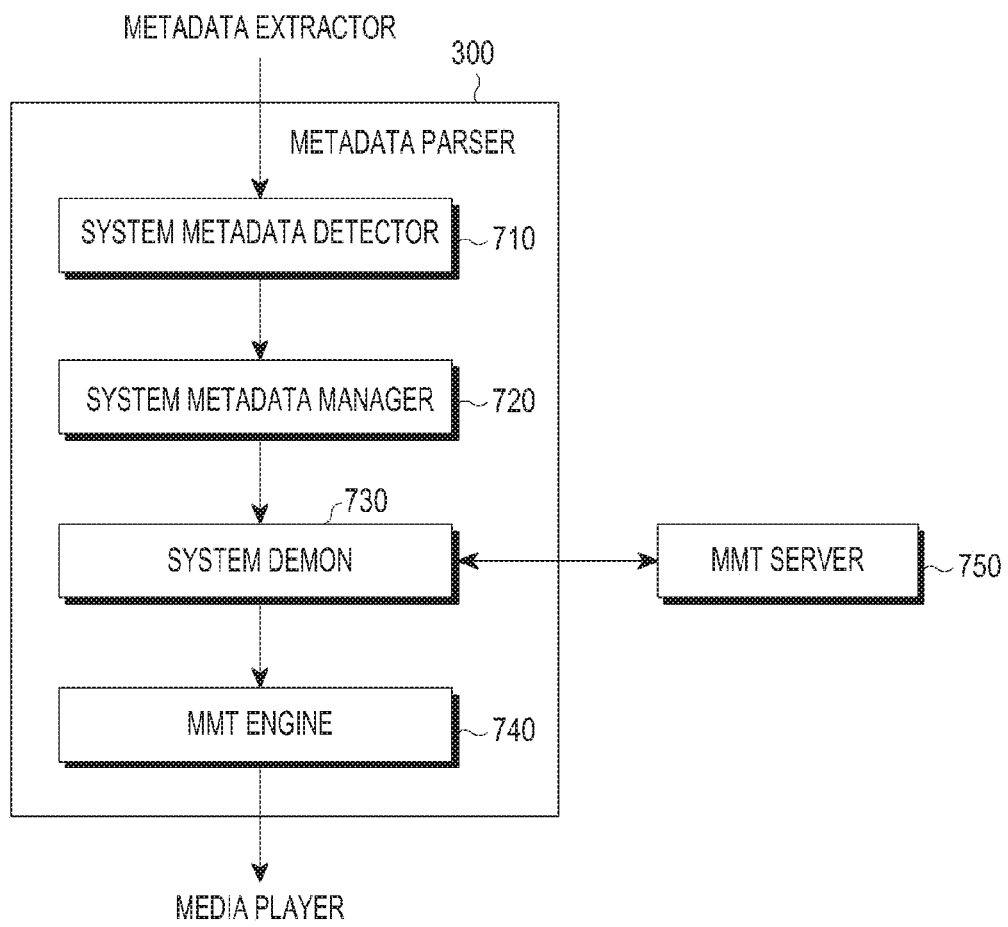
FIG. 7 illustrates an example of a structure of a metadata parser 300 in FIG. 3 included in a TV according to an embodiment of the present disclosure.

FIG. 7 illustrates an example of a structure of a metadata parser 300 in FIG. 3 included in a TV according to an embodiment of the present disclosure.

The metadata parser 300 includes a system metadata detector 710, a system metadata manager 720, a system demon unit 730, and an MMT processor 740.

The system metadata detector 710 determines whether a TV supports an MMT (or DASH) format based on system information delivered from a metadata extractor 310 of the TV and information received from component elements (not shown) included in the TV. The component elements which are not shown correspond to component elements 610-645 as described in FIG. 6. The system metadata manager 720 may determine whether to process metadata received in the TV using MMT (or DASH) based on the information.

An operation of a TV in possible cases according to whether a set top box and the TV connected to the set top box support an MMT format will be described below.

Case 2-1

In a case that all of a current set top box and a TV connected to the set top box are devices supporting MMT, if an audio bit stream into which unnecessary system metadata is inserted is delivered to the TV through the set top box, the TV may malfunction. In this case, the system metadata manger 720 in the TV does not process the metadata included in the audio bit stream even though the system metadata manger 720 receives the metadata.

Case 2-2

If a current set top box is a device supporting MMT, and a TV connected to the set top box is a device which does not support the MMT, the TV acts a role as a only display. So, the TV does not need to perform any operation.

Case 2-3

If a set top box is a device which does not support MMT, and a TV connected to the set top box is a device supporting the MMT, only the TV may perform an operation of processing an MMT format, so the TV performs an operation suitable for metadata within a received audio bit stream.

Case 2-4

If all of a current set top box and a TV connected to the set top box are devices which do not support MMT, there is no device capable of processing an MMT format. So, the TV does not need to perform any operation on metadata.

A main operation of a set top box and a TV according to an embodiment of the present disclosure will be described below.

Figure 8:
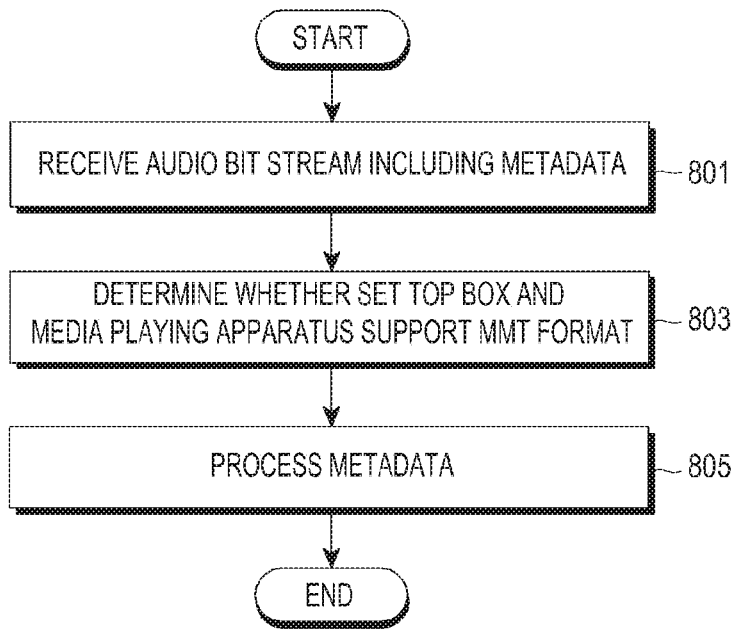
FIG. 8 illustrates an operation of a set top box according to an embodiment of the present disclosure.

FIG. 8 shows an operation related to metadata of a set top box according to an embodiment of the present disclosure.

A set top box receives contents data. The contents data includes an audio bit stream including metadata and a video bit stream (801).

The set top box determines whether the set top box and the media playing apparatus support an MMT format (803). This may be performed as described in FIG. 6.

The set top box processes metadata according to whether at least one of the set top box and the media playing apparatus supports the MMT format. That is, the set top box bypasses the audio bit stream including the metadata to a TV connected to the set top box or performs other operation (805). This operation has been described with reference to FIG. 6. Meanwhile, the set top box may add, delete, substitute, and change metadata as described in FIG. 6.

Figure 9:
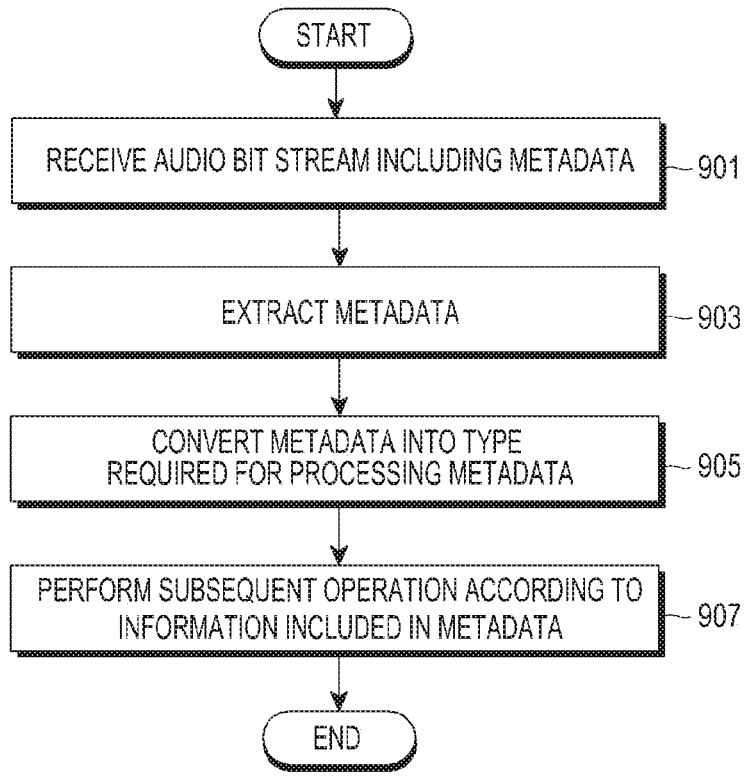
FIG. 9 illustrates an operation of a media playing apparatus (e.g., a TV) according to an embodiment of the present disclosure.

FIG. 9 illustrates an operation related to metadata of a media playing apparatus (e.g., a TV) according to an embodiment of the present disclosure.

It will be assumed that a TV receives an audio bit stream including metadata which a set top box bypasses (901). The TV extracts the metadata from the audio bit stream (903), and converts the metadata into a type required for processing the metadata (905).

Then, a subsequent operation is performed according to information included in metadata (907). This has been described with reference to FIG. 3. Concretely, if the metadata includes information related to obtainment of media data and information required for playing back the media data, the media data is obtained from a media server through a separate interface and protocols 350 and 360 using the information related to the obtainment of the media data (e.g., URL), the media data is played back using the obtained media data and the information required for playing back the media data.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

The invention claimed is:

1. A method for providing media data in a set top box, the method comprising:
    receiving an audio bit stream including metadata related to the media data to be processed based on an MPEG media transport (MMT) protocol;
    determining, using at least one processor of the set top box, whether a media playing apparatus connected to the set top box supports the MMT protocol;
    in case that the media playing apparatus supports the MMT protocol, bypassing the audio bit stream including the metadata to the media playing apparatus without decoding the audio bit stream; and
    in case that the media playing apparatus does not support the MMT protocol, decoding the audio bit stream and modifying the metadata included in the audio bit stream.

2. The method of claim 1, wherein the media playing apparatus supports the MMT protocol is determined based on information obtained from at least one of a device API included in the set top box, a server connected to the set top box, and the media playing apparatus.

3. The method of claim 1,
    wherein the metadata includes an identifier of a service which the media data provides,
    wherein the metadata is a determined packet, and
    wherein the metadata includes information indicating a system from which the media data is provided.

4. The method of claim 1,
    wherein the metadata is generated by a contents provider of the media data,
    wherein the metadata is added, changed, or replaced by a service provider which delivers the media data, or wherein the metadata is added, changed, or replaced by the set top box.

5. A method for playing back media data in a media playing apparatus, the method comprising:
receiving an audio bit stream associated with the media data to be processed based on an MPEG media transport (MMT) protocol from a set top box;
playing the media data;
in case that the media playing apparatus supports the MMT protocol, the audio bit stream including metadata related to the media data is bypassed without decoding the audio bit stream by the set top box; and
in case that the media playing apparatus does not support the MMT protocol, the audio bit stream is decoded and the metadata included in the audio bit stream is modified by the set top box.

6. The method of claim 5,
wherein the metadata includes an identifier of a service which the media data provides,
wherein the metadata is a determined packet, and
wherein the metadata includes information indicating a system from which the media data is provided.

7. The method of claim 5,
wherein the metadata is generated by a contents provider of the media data,
wherein the metadata is added, changed, or replaced by a service provider which delivers the media data, or
wherein the metadata is added, changed, or replaced by the set top box.

8. A set top box for providing media data, the set top box comprising:
an input interface configured to receive an audio bit stream including metadata related to the media data which is to be processed based on an MPEG media transport (MMT) protocol;
a protocol detector configured to determine whether a media playing apparatus connected to the set top box supports the MMT protocol; and
a metadata generator configured to:
in case that the media playing apparatus supports the MMT protocol, bypass the audio bit stream including the metadata to the media playing apparatus without decoding the audio bit stream, and
in case that the media playing apparatus does not support the MMT protocol, decode the audio bit stream and modify the metadata included in the audio bit stream.

9. The set top box of claim 8,
wherein the metadata includes an identifier of a service which the media data provides,
wherein the metadata is a determined packet, and
wherein the metadata includes information indicating a system from which the media data is provided.

10. The set top box of claim 8,
wherein the metadata is generated by a contents provider of the media data,
wherein the metadata is added, changed, or replaced by a service provider which delivers the media data, or
wherein the metadata is added, changed, or replaced by the set top box.

11. A media playing apparatus for playing back media data, the media playing apparatus comprising:
an input interface configured to receive an audio bit stream associated with the media data to be processed based on an MPEG media transport (MMT) protocol from a set top box; and
a media player configured to play the media data,
wherein in case that the media playing apparatus supports the MMT protocol, the audio bit stream including metadata related to the media data is bypassed without decoding the audio bit stream by the set top box, and
wherein in case that the media playing apparatus does not support the MMT protocol, the audio bit stream is decoded and the metadata included in the audio bit stream is modified by the set top box.

12. The media playing apparatus of claim 11,
wherein the metadata includes an identifier of a service which the media data provides,
wherein the metadata is a determined packet, and
wherein the metadata includes information indicating a system from which the media data is provided.

13. The media playing apparatus of claim 11,
wherein the metadata is generated by a contents provider of the media data,
wherein the metadata is added, changed, or replaced by a service provider which delivers the media data, or
wherein the metadata is added, changed, or replaced by the set top box.

* * * * *